United States Patent
Vertnik

[15] 3,664,980
[45] May 23, 1972

[54] POLYAMIDES OF POLYMERIC FAT ACIDS AND 1-AMINO-3-AMINOMETHYL-3,5,5-TRIMETHYL CYCLOHEXANE

[72] Inventor: Leonard R. Vertnik, Minneapolis, Minn.
[73] Assignee: General Mills, Inc.
[22] Filed: June 22, 1970
[21] Appl. No.: 48,559

Related U.S. Application Data

[63] Continuation-in-part of Ser. No. 671,604, Sept. 29, 1967, abandoned.

[52] U.S. Cl. ..........................260/18 N, 260/78, 260/404.5, 264/331
[51] Int. Cl. .......................................................C08g 20/26
[58] Field of Search..............................260/404.5, 78, 18 N

[56] References Cited

UNITED STATES PATENTS

| | | | |
|---|---|---|---|
| 3,531,423 | 9/1970 | Stokes | 260/18 |
| 3,516,972 | 6/1970 | Wolfes | 260/18 X |
| 3,483,237 | 12/1969 | Peerman | 260/404.5 |
| 3,454,412 | 7/1969 | Stokes | 260/18 X |
| 3,447,999 | 6/1969 | Rogier | 260/18 X |
| 3,377,303 | 4/1968 | Peerman | 260/18 |
| 3,352,831 | 11/1967 | Schmitt | 260/78 |
| 3,352,834 | 11/1967 | Schmitt | 260/78 |
| 3,352,835 | 11/1967 | Schmitt | 260/78 |
| 3,352,836 | 11/1967 | Schmitt | 260/78 |
| 3,352,913 | 11/1967 | Schmitt | 260/78 |

FOREIGN PATENTS OR APPLICATIONS

| | | | |
|---|---|---|---|
| 89,614 | 7/1967 | France | 260/18 N |
| 6,601,952 | 8/1966 | Netherlands | 260/18 N |

*Primary Examiner*—Donald E. Czaja
*Assistant Examiner*—C. Warren Ivy
*Attorney*—Anthony A. Juettner and Patrick J. Span

[57] ABSTRACT

There is disclosed polymeric fat acid polyamides of 1-amino-3-aminomethyl-3,5,5-trimethyl cyclohexane. Copolymerizing dibasic acids, amino acids or lactams or other diprimary diamines may also be employed. The polyamides are prepared under conventional amidification methods involving heating at 100°–300° C. for a time sufficient to effect amidification. The polymers find utility as adhesives (hot melt), self-supporting films and are particularly useful in the shoe industry for box toe printing applications.

15 Claims, No Drawings

POLYAMIDES OF POLYMERIC FAT ACIDS AND 1-AMINO-3-AMINOMETHYL-3,5,5-TRIMETHYL CYCLOHEXANE

This is a continuation-in-part application of copending application Ser. No. 671,604 filed Sept. 29, 1967 now abandoned.

This invention relates to high molecular weight polyamide compositions and more particularly to polyamide compositions of 1-amino-3-aminomethyl-3,5,5-trimethyl cyclohexane and fractionated polymeric fat acids. Further, the invention also relates to copolymer polyamide compositions in which certain other dibasic acids or esters, amino acids, other diamine or other amide forming derivatives are employed.

The polyamides of the present invention, particularly those employing little, if any, copolymerizing reactants exhibit high tensile strength, high tensile modulus, and elevated melting points. By the use of copolymerizing reactants, polymers of tailored properties can be provided. The polymers find utility as adhesives, engineering plastics, self-supporting films and are particularly useful as reinforcing resins in the shoe industry for box toe printing application.

It is an object of this invention to provide polyamide compositions or polymers utilizing fractionated polymeric fat acids and 1-amino-3-aminomethyl-3,5,5-trimethyl cyclohexane.

Briefly, the polymeric fat acid polyamides are prepared from polymeric fat acids having a dimeric fat acid content greater than 85 percent by weight and preferably greater than 90 percent by weight and 1-amino-3-aminomethyl-3,5,5-trimethyl cyclohexane. The polyamides are prepared by conventional amidification procedures, which usually include heating at temperatures between 100° and 300° C., preferably 200° to 275° C., for a time sufficient to complete reaction, usually about 2 to 8 hours and most usually about 4 to 6 hours. Optionally, a catalyst is employed, such as triphenyl phosphite, to accelerate the reaction so that time periods on the order of 3–4 hours are usually sufficient for the amidification reaction. The reaction proceeds without the catalyst, although longer time periods may be necessary, i.e., about 6–8 hours. In order to minimize foaming of the reactant mixture during reaction, conventionally anti-foam agents are employed such as Dow Corning Anti-Foam A (DCAA). The reaction is generally conducted while removing the by-product water of reaction, frequently under vacuum particularly at the end of the reaction.

Typical compositions of commercially available polymeric fat acids, based on unsaturated $C_{18}$ fat acids (tall oil fatty acids) are

| | |
|---|---|
| $C_{18}$ monobasic or monomeric fat acids ("monomer") | 5–15% by weight |
| $C_{36}$ dibasic or dimeric fat acids ("dimer") | 60–80% by weight |
| $C_{54}$ (and higher) polybasic or trimeric fat acids ("trimer") | 10–35% by weight |

While the foregoing commercially available product is prepared by polymerization of unsaturated fatty acids in tall oil fatty acids, similar polymeric fat acids may be prepared from other monobasic or monocarboxy aliphatic acids, naturally occurring or synthetic, having hydrocarbon chains of eight to 24 carbon atoms which will be referred to herein as a "fat acid" or "monomeric fat acid." The preferred monocarboxylic acids are those having from 16–20 carbon atoms, the most preferred being those having 18 carbon atoms, such as oleic and linoleic acids, a mixture of which are found in tall oil fatty acids.

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimeric fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric and trimeric fat acids.

The saturated fat acids are generally polymerized by somewhat different techniques than those described in U.S. Pat. No. 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic, acid, palmitic acid, isopalmitic, stearic acid, arachidic acid, behenic acid, and lignoceric acid.

The ethylenically and acetylenically unsaturated fat acids which may be polymerized and their method of polymerization are described in the above mentioned U.S. Pat. No. 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by conventional gas-liquid chromatography of the corresponding methyl esters. Another method of determination is a micromolecular distillation analytical method. This method is that of R. F. Paschke et. al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, the gas-liquid chromatography (G.L.C.) method was employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

As earlier indicated, the polymeric fat acids employed to prepare the polyamides used in this invention have a dimeric fat acid content in excess of 85 percent by weight and preferably in excess of 90 percent by weight. Such polymeric fat acids are obtained by fractionation by suitable means such as high vacuum distillation or by solvent extraction techniques from polymeric fat acids having lower dimeric fat acid contents, such as the common commercially available products described earlier. One method of preparation of polymeric fat acids can be seen in U.S. Pat. No. 3,157,681. The preparation of light colored polymeric fat acids which may be employed in the present invention, can also be seen in U.S. Pat. No. 3,256,304 which describes the hydrogenation of polymeric fat acids.

For optimum properties, it is generally preferable that the polymeric fat acids employed have a dimeric fat acid content greater than about 85 percent by weight, more preferably above 90 percent by weight and most desirably in excess of 95 percent by weight. This preference arises as a practical matter due to the lack of necessity for trimer or monomer content control at the higher dimer contents to provide polyamides having the desired properties such as tensile strength and elongation. At dimeric fat acid contents above 95 percent by weight, virtually no control or trimer or monomer content is necessary. At the lowest dimeric fat acid contents, i.e., about 85 percent, it is preferred that the trimer to monomer ratio by weight be within the range of about 0.6:1 to 4.0:1. As the dimeric fat acid content increases, lesser control is needed and the range of the trimer to monomer ratio widens to the point where virtually no attention is required when the dimeric fat acid content approaches values about 95 percent by weight. At about 90 percent dimeric fat acid content, this ratio preferably lies in the range of about 0.3:1 to 10:1. Of course, under idealized conditions, such as 100 percent dimeric fat acid content, there is no trimer or monomer and the ratio thereby varies theoretically from zero to infinity.

The polyamides are prepared by reacting the polymeric fat acids with the 1-amino-3-aminomethyl-3,5,5-trimethyl cyclohexane. The resins may also include other copolymerizing diacid and diamine components and the copolymerizing di-acids or diamines employed may be a single diamine or a mixture of two different copolymerizing reactants. In addition, small amounts of monomeric, monocarboxylic acids may be present. In order to achieve the desirable properties, particularly the high tensile modulus properties, it is necessary, however, that the 1-amino-3-aminomethyl-3,5,5-trimethyl cyclohexane be used in an amount so as to furnish at least 80 amine equivalent percent, and preferably 90 equivalent percent of the total amine employed. The exact amount will be dependent primarily on the particular codiamine employed. With the alkylene diamines employed as to co-diamine, the high tensile modulus properties, i.e., greater than 40,000 psi, are achieved employing at least 80 amine equivalent percent of the 1-amino-3-aminomethyl-3,5,5-trimethyl cyclohexane. With the higher molecular weight diamines, such as dimer diamine, the 1-amino-3-aminomethyl-3,5,5-trimethyl cyclohexane should preferably contribute about 95 percent or more of the total amine equivalents and it is preferred that a copolymerizing dicarboxylic acid by employed therewith. The amount of monomeric, monocarboxylic acids which may be present is dependent primarily on the amount of the 1-amino-3-aminomethyl-3,5,5-trimethyl cyclohexane present. It is also in part dependent on whether a copolymerizing dicarboxylic acid or diamine is employed and the particular monomeric acid employed. Generally the level of monomeric monocarboxylic acid should not exceed 10 equivalent percent of the total acid equivalents and preferably should not exceed 5 equivalent percent. Accordingly, any monomeric monocarboxylic acid present having up to 22 carbon atoms should be less than 10, and preferably less than 5 equivalent percent. With regard to any of the acid components, any of the equivalent amide-forming derivatives thereof may be employed, such as the alkyl and aryl esters, preferably alkyl esters having from one to eight carbon atoms, the anhydrides or the chlorides.

The copolymerizing diamines employed may be aliphatic, cycloaliphatic or aromatic diprimary diamines, which may be ideally represented by the formula $$H_2N-R-NH_2$$

where R is an aliphatic, cycloaliphatic or aromatic hydrocarbon radical preferably having from two to about 40 carbon atoms. Representative of such diamines are ethylene diamine, 1,2-diamino propane, 1,3-diamino propane, 1,3-diamino butane, tetramethylene diamine, pentamethylene diamine, hexamethylene diamine, decamethylene diamine, octadecamethylene diamine, metaxylylene diamine, paraxylylene diamine, cyclohexylene diamine, bis-(aminoethyl)-benzene, cyclohexane-bis-(methyl amine), diamino-dicyclohexyl methane, methylene dianiline, piperazine, N-aminoethylpiperazine, dimethylpiperazine and dimeric fat diamine. The diamine may be employed alone or mixtures of two or more may be employed. The most preferred diamines are the alkylene diamines in which the alkylene group has from two to six carbon atoms and the dimeric fat diamine (preferably having 36 carbon atoms).

The dimeric fat diamine, sometimes referred to as "dimer diamine," "dimeric fat amine," or "polymeric fat acid diamine" are the diamines prepared by amination of dimeric fat acids. Reference is made thereto in U.S. Pat. No. 3,010,782. As indicated therein, these are prepared by reacting polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —$CH_2NH_2$ groups. Further, this diamine is also described in Research and Development Products Bulletin, CDS 2–63 by General Mills, Inc., June 1, 1963, as "-Dimer Diamine" illustrated by the formula $H_2N-D-NH_2$ where D is a 36-carbon hydrocarbon radical of a dimeric fat acid.

The copolymerizing carboxylic compounds commonly employed are aliphatic, cycloaliphatic or aromatic dicarboxylic acids or esters which may be defined ideally by the formulas:

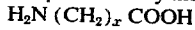

where R' is an aliphatic, cycloaliphatic or aromatic hydrocarbon radical preferably having from one to 20 carbon atoms and $R_1$ is hydrogen or an alkyl group (preferably having from one to eight carbon atoms). Illustrative of such acids are oxalic, malonic, adipic, sebacic, suberic, pimelic, azelaic, succinic, glutaric, isophthalic, terephthalic, phthalic acids, naphthalene dicarboxylic acids and 1,4- or 1,3-cyclohexane dicarboxylic acid.

Other copolymerizing reactants may be amino acids or the corresponding lactams represented by the following formula $$H_2N(CH_2)_x COOH$$

where x is an integer from 2 to 15, the corresponding lactams being represented by the formula

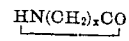

In general, the most common amino acids or corresponding lactams are aminocaproic acid (or epsilon caprolactam), amino-undecanoic acid and omega caprylactam where x is 5, 10, and 7 respectively.

Other difunctional coreactants are the monoalkanol amines which may ideally be represented by the formula $$H_2N R'' OH$$

where R'' is a divalent aliphatic hydrocarbon radical, desirably having from two to eight carbon atoms and preferably an alkylene radical having from two to eight carbon atoms such as monoethanolamine, propanolamine, butanolamine, 2-amino-3-hexanol, 2-amino-4-pentanol, 5-amino-4-octanol, 3-amino-3-methyl-2-butanol. Where an alkanol amine is employed, a polyester-polyamide product is provided.

Essentially molar equivalent amounts of carboxyl and amino groups are employed in preparing the polyamide, i.e., the ratio of amine to acid equivalents being at least 0.95. Where an alkanol amine is employed, the carboxyl groups employed are essentially equivalent to the amine plus hydroxyl groups. Where copolymerizing dicarboxylic acids or amino acids are employed, it is preferred that the carboxyl groups from the polymeric fat acid should account for at least 25, and preferably 50, equivalent percent of the total carboxyl groups present. Also, where an alkanol amine or amino acid is employed, it is preferable that the amine groups from the 1-amino-3-aminomethyl-3,5,5-trimethyl cyclohexane should account for at least 80 equivalent percent of the total amine groups present, as earlier indicated.

In addition to tensile strength and elongation, the following properties were measured on most of the polymers prepared:
1. Ball and ring softening point: ASTM E28–59T.

2. Amine and acid end groups: conventional analytical titration procedures. The results are expressed in terms of milligrams of potassium hydroxide (KOH) equivalent to the acid or amine in one gram of product.

3. Inherent viscosity: defined by equation:

$$inh = (ln\eta rel)/C$$

where $C$ = concentration of polymer in grams per 100 ml. of solvent, $ln\eta rel$ = natural logarithm of the relative viscosity of the dilute polymer solution.

In the examples below all viscosities are measured in m-cresol at 30° C., usually at a concentration of 1.0 g./100 ml.

4. Tensile modulus: as defined in ASTM D638–60T.

The following examples will serve to further illustrate the invention in which all parts and percentages are by weight unless otherwise indicated.

EXAMPLE I

Into a reactor equipped with a stirrer, thermocouple, and a distillation head was placed 570 g. (2.00 equivalents of the distilled and hydrogenated polymeric fat acids prepared from tall oil fat acids) having the following G.L.C. analysis:

| | | |
|---|---|---|
| % Monomer (M) | = | 1.7 |
| % Intermediate (I) | = | 4.5 |
| % Dimer (D) | = | 90.7 |
| % Trimer (T) | = | 3.1 |
| Saponification equivalent (S.E.) | = | 197.0 |
| Neutralization equivalent (N.E.) | = | 189.9 |
| Iodine (I.V.) | = | 7.4 | and 164 g. (1.94 equivalents) of 1-amino-3-aminomethyl-3,5,5-trimethyl cyclohexane. To provide optimum color properties one-half percent by weight of dimer acid of triphenyl phosphite was employed.

The mechanical properties of direct interest in the compositions of the present invention are tensile strength and elongation. These properties are measured on an Instron Tensile Tester Model TTC using ASTM D 1708–59T.

The polymer is compression molded as a 6 × 6 inch sheet of approximately 0.04 inches thickness, at a temperature near its melting point (usually a few degrees lower than the melting point) and at 20,000 lbs. ram force or higher using cellophane or Mylar as the parting agent in the mold. From this sheet, test specimens are die-cut to conform to ASTM 1708–59T.

The test specimen is clamped in the jaws of the Instron. Crosshead speed is usually 0.5 inch/minute at 100 pound full scale load. Chart speed is 0.5 inch/minute. Tensile strength (reference: ASTM D–638–52T) is calculated as:

$$\text{Tensile strength} = \frac{\text{maximum load in pounds}}{\text{cross sectional area (sq. in.)}}$$

Percent elongation is calculated as:

Percent Elong.

$$= \frac{\text{gage length at break minus gage length at 0 load}}{\text{gage length at 0 load}} \times 100$$

The mixture was heated over a period of about 2 hours to 250° C., maintained for 2.0 hours at 250° C. under a nitrogen sweep and finally for about 2 hours under vacuum (ca. <10 mm Hg) at 250° C. The resulting polyamide was light colored having the following properties:

| | |
|---|---|
| Tensile strength | 3475 psi |
| Elongation | 213% |
| Melt viscosity at 250°C. | 48 poise |
| Yield strength | 3300 psi |
| Inherent viscosity | 0.373 |

The high modulus properties were confirmed by determining their film (3–5 mils) properties which showed a yield point of 2,890 psi., break point of 2,720 psi., 140 percent elongation and the tensile modulus of the film at 2 percent elongation was 65,900 psi.

For comparison purposes, a polymer was prepared in the same manner as above employing the same polymeric fat acids but substituting hexamethylene diamine for the 1-amino-3-aminomethyl-3,5,5-trimethyl cyclohexane, to provide a product having the identical inherent viscosity of 0.373. However, the hexamethylene diamine product had a tensile film modulus at 2 percent elongation of only 18,000 psi.

EXAMPLE II

A number of copolymers were prepared employing the distilled and hydrogenated polymerized tall oil fatty acids of Example I, in the same manner as in Example I but replacing a portion of the 1-amino-3-aminomethyl-3,5,5-trimethyl cyclohexane with another diprimary diamine.

The results and preparations can be seen from the following Table I, which includes products of low tensile modulus for comparison.

TABLE I (A) Polymer preparation data

| | | Equivalents | | Analysis | | | Viscosity | | |
|---|---|---|---|---|---|---|---|---|---|
| Product | Co-amine [1] | Amine [2] co-amine | Amines acids | Ball and ring softening point, °C. | Amine No. | Acid No. | Melt, P/250° C. | Inherent 0.5% in chlorophenol | VPO mol. wt. in CHCl₃ |
| a | EDA | 50/50 | 0.97 | 122 | 0.8 | 6.2 | 30 | 0.285 | 6,560 |
| b | HMDA | 50/50 | 0.97 | 121 | 0.0 | 7.2 | 55 | 0.411 | ([3]) |
| c | DA | 90/10 | 0.98 | 125 | 0.0 | 6.1 | 51 | 0.392 | 7,250 |
| d | 1,3 DAP | 90/10 | 0.98 | 131 | 0.4 | 3.9 | 98 | 0.401 | 8,260 |
| e | DA | 80/20 | 0.98 | 138 | 0.0 | 4.5 | 132 | 0.413 | 9,760 |
| f | HMDA | 10/90 | 0.98 | 120 | 0.0 | 5.3 | 189 | 0.472 | 9,010 |
| g | 1,3 DAP | 80/20 | 0.98 | 138 | 0.8 | 3.4 | 110 | 0.376 | 9,800 |

[1] EDA=ethylene diamine; HMDA=hexamethylene diamine; DA=dimeryl amine (diprimary diamine of a dimeric fat acid from tall oil acids); 1,3 DAP=1,3-diaminopropane.
[2] 1-amino-3-aminomethyl-3,5,5-trimethyl cyclohexane.
[3] Not determined.

(B) Polymer evaluation

| | Polymer sheet (50 mil thick), tensile | | | Film properties (2–5 mils thick), tensile | | | | Tensile impact, L spec., ft.-lbs. |
|---|---|---|---|---|---|---|---|---|
| Product | Yield pt., p.s.i. | Break pt., p.s.i. | Elong. at break, percent | Yield pt., p.s.i. | Break pt., p.s.i. | Elong. at break, percent | Modulus, p.s.i. | |
| a | | 2,605 | 402 | 1,600 | 3,040 | 432 | 8,100 | 11.3 |
| b | 313 | 3,186 | 512 | 840 | 3,370 | 479 | 1,380 | 405 |
| c | 2,011 | 3,084 | 296 | 2,830 | 3,400 | 367 | 19,500 | 2.6 |
| d | 3,113 | 3,512 | 244 | 3,080 | 2,990 | 195 | 66,800 | 3.6 |
| e | 1,118 | 3,407 | 364 | 1,510 | 3,830 | 538 | 14,200 | 289 |
| f | 1,027 | 2,485 | 519 | 1,420 | 3,290 | 812 | 10,600 | 196 |
| g | 2,619 | 3,559 | 289 | 3,040 | 3,160 | 346 | 49,300 | 9.2 |

EXAMPLE III

Two polymers were prepared using the same procedure as Example I and the same hydrogenated and distilled polymerized tall oil fatty acids of Ex. I. In both polymers, the co-amine employed was 1,3-di(4-piperidyl) propane, and in both instances the ratio of amine equivalents of 1-amino-3-amino-methyl-3,5,5-trimethyl cyclohexane to the co-amine was 90:10. In product (a) the equivalents ratio of amine to carboxyl was 0.96 and in product (b) the ratio was 0.98. The results were as follows:

|  | Product (a) | Product (b) |
|---|---|---|
| Ball and Ring Softening Point °C. | 128 | 130 |
| Amine No. | 0.2 | 0.2 |
| Acid No. | 5.2 | 5.1 |
| Melt Viscosity, poise/250°C. | 64 | 180 thick |
| Tensile | | |
| Yield Point, p.s.i. | 1857 | 2770 |
| Break Point, p.s.i. | 3196 | 3891 |
| Elongation at Break, % | 282 | 275 |
| Tensile Modulus at 2% elongation | 42800 | 60000 |

EXAMPLE IV

Three polyamides were prepared in the same manner as Example I, but employing a non-hydrogenated distilled polymeric fat acid (polymerized tall oil fatty acids), which had the following analysis:

| | |
|---|---|
| % Monomer | 2.3 |
| % Intermediate | 2.8 |
| % Dimer | 91.4 |
| % Trimer | 3.4 |
| Acid Value | 188.4 |
| Saponification Value | 198.8 |

The reactants employed were as follows:

Product A: No co-amine or co-acid employed. Sole diamine was 1-amino-3-aminomethyl-3,5,5-trimethyl cyclohexane employing a ratio of equivalents of amine to carboxyl of 0.97.

Product B: Ethylene diamine was employed as a co-amine. The ratio of amine equivalents from 1-amino-3-aminomethyl-3,5,5-trimethyl cyclohexane to ethylene diamine was 95:5. The ratio of equivalent of amine to carboxyl was 0.98.

Product C: In this product both a co-amine and a co-acid was employed. The co-amine was the diamine of the dimer of polymerized tall oil fatty acids and the ratio of amine equivalents from 1-amino-3-aminomethyl-3,5,5-trimethyl cyclohexane to this co-amine was 97:3. The co-acid was sebacic acid and the ratio of carboxyl equivalents of the polymerized tall oil fatty acids to the sebacic acid was 100:45. The total ratio of equivalents of amine to carboxyl employed was 0.97.

The results can be seen from the following Table II.

boxyl groups employed, said 1-amino-3-aminomethyl-3,5,5-trimethyl cyclohexane contributing at least 80 equivalent percent of the amine equivalents and the presence of a monomeric monocarboxylic acid does not exceed 10 equivalent percent of the acid equivalents employed.

2. A polyamide as defined in claim 1 wherein said temperature is about 250° C.

3. A polyamide as defined in claim 1 wherein said polymeric fat acid is a polymerized monocarboxylic aliphatic hydrocarbon acid of from 16–20 carbon atoms.

4. A polyamide as defined in claim 1 wherein said polymeric fat acid is a polymerized monocarboxylic, aliphatic, hydrocarbon acid having 18 carbon atoms.

5. A polyamide as defined in claim 1 wherein said polymeric fat acid is polymerized tall oil fatty acids.

6. A polyamide as defined in claim 1 wherein the ratio of amine to acid equivalents employed is at least 0.95.

7. A polyamide composition having a tensile modulus greater than about 40,000 psi comprising the amidification product at temperatures of from 100° to 300° C. wherein the molar equivalents of amine employed are essentially equal to the molar equivalents of carboxyl groups employed of
 a. 100 carboxyl equivalent percent of a polymeric fat acid having a dimeric fat acid content greater than 85 percent by weight
 b. from 80–100 amine equivalent percent of 1-amino-3-aminomethyl-3,5,5-trimethyl cyclohexane and
 c. from 0–20 equivalent percent of a diamine selected from the group consisting of alkylene diamines in which said alkylene group has from two to six carbon atoms, 1,3-di(4-piperidyl) propane and dimer diamine, and the sum of amine equivalents of (b) and (c) being substantially 100 equivalent percent and provided that when said diamine is dimer diamine the amine equivalent percent of said 1-amino-3-aminomethyl-3,5,5-trimethyl cyclohexane is not less than about 95 percent.

8. A polyamide as defined in claim 7 wherein said polymeric fat acid is a polymerized monocarboxylic, aliphatic, hydrocarbon acid having 18 carbon atoms and having a dimeric fat acid content greater than 90 percent by weight and said diamine is ethylene diamine.

9. A polyamide as defined in claim 7 wherein said polymeric fat acid is a polymerized monocarboxylic, aliphatic, hydrocarbon acid having 18 carbon atoms and having a dimeric fat acid content greater than 90 percent by weight and said diamine is hexamethylene diamine.

10. A polyamide as defined in claim 7 wherein said polymeric fat acid is a polymerized monocarboxylic, aliphatic, hydrocarbon acid having 18 carbon atoms and having a dimeric fat acid content greater than 90 percent by weight and said diamine is 1,3-diaminopropane.

11. A polyamide as defined in claim 7 wherein said polymeric fat acid is a polymerized monocarboxylic aliphatic hydrocarbon acid having 18 carbon atoms and having a dimer-

| | | | Ball and ring softening point, °C. | Melt viscosity, poise/ 250° C. | Polymer sheet—50 mil thick | | | |
|---|---|---|---|---|---|---|---|---|
| | | | | | Tensile | | | Tensile modulus at 2% elongation |
| Product | Amine No. | Acid No. | | | Yield pt., p.s.i. | Break pt., p.s.i. | Elongation at break, percent | |
| A | 0.1 | 4.5 | 140 | [1] 153 | 2,623 | 3,367 | 275 | |
| B | 0.2 | 3.0 | 144 | 150 | 2,775 | 3,181 | 237 | 82,700 |
| C | 0.0 | 5.9 | 145 | 116 | 3,657 | 3,189 | 157 | |

[1] At 225° C.

The embodiments of the present invention in which an exclusive property or privilege is claimed are defined as follows:

1. A polyamide composition having a tensile modulus greater than about 40,000 psi comprising the amidification product at temperatures of from 100° to 300° C. of a polymeric fat acid having a dimeric fat acid content greater than 85 percent by weight and 1-amino-3-aminomethyl-3,5,5-trimethyl cyclohexane, the molar equivalents of amine employed being essentially equal to the molar equivalents of caric fat acid content greater than 90 percent by weight and said diamine is dimer diamine having the formula $H_2N—D—NH_2$ where D is the 36-carbon hydrocarbon radical of a dimerized 18-carbon atom fat acid.

12. A polyamide as defined in claim 7 wherein said polymeric fat acid is a polymerized monocarboxylic aliphatic hydrocarbon acid having 18 carbon atoms and having a dimeric fat acid content greater than 90 percent by weight and said diamine is 1,3-di(4-piperidyl) propane.

13. A polyamide composition having a tensile modulus greater than about 40,000 psi comprising the amidification product at temperatures of from 100°–300° C. wherein the molar equivalent amounts of amine employed are substantially equal to the molar equivalents of carboxyl groups employed of
   a. 50–100 equivalent percent of a polymeric fat acid having a dimeric fat acid content greater than 85 percent by weight
   b. 0–50 equivalent percent of sebacic acid
   c. 80–100 amine equivalent percent of 1-amino-3-aminomethyl-3,5,5-trimethyl cyclohexane and
   d. 0–20 equivalent percent of a diprimary diamine selected from the group consisting of alkylene diamines in which said alkylene group has from two to six carbon atoms and dimer diamine, and the sum of carboxyl equivalents of (a) and (b) and the sum of amine equivalents of (c) and (d) being substantially 100 equivalent percent and provided that when said diamine is dimer diamine the amine equivalent percent of diamine 1-amino-3-aminomethyl-3,5,5-trimethyl cyclohexane is not less than about 95 percent.

14. A polyamide as defined in claim 13 wherein said polymeric fat acid is a polymerized monocarboxylic aliphatic hydrocarbon acid having 18 carbon atoms and having a dimeric fat acid content greater than 90 percent by weight and said diamine is ethylene diamine.

15. A polyamide as defined in claim 13 wherein said polymeric fat acid is a polymerized monocarboxylic aliphatic hydrocarbon acid having 18 carbon atoms and having a dimeric fat acid content greater than 90 percent by weight and said diamine is dimer diamine having the formula $H_2N-D-NH_2$ where D is the 36-carbon hydrocarbon radical of a dimerized 18-carbon atom fat acid.

* * * * *